United States Patent Office.

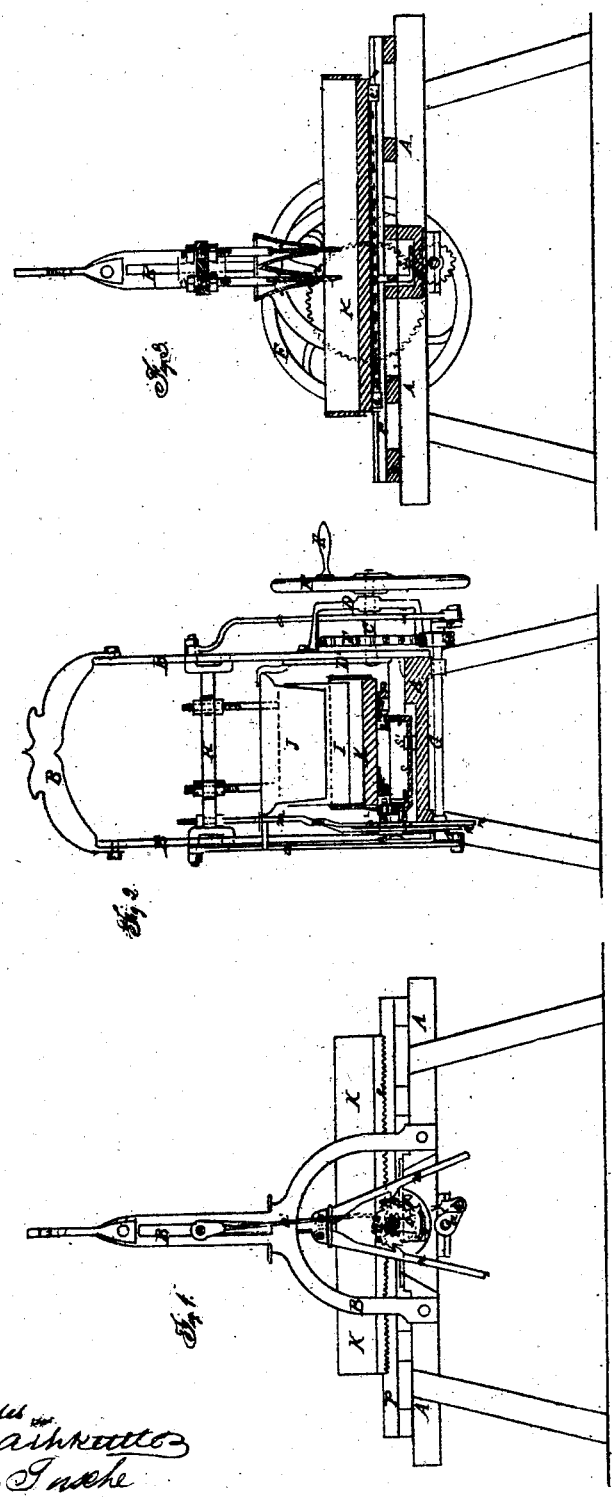

JACOB NACHER, OF LA CROSSE, WISCONSIN, ASSIGNOR TO HIMSELF AND A. RENGGLY AND J. ULRICH, OF SAME PLACE.

Letters Patent No. 74,409, dated February 11, 1868.

---

IMPROVED MEAT-CUTTER.

---

The Schedule referred to in these Letters Patent and making part of the same.

---

TO ALL WHOM IT MAY CONCERN:

Be it known that I, JACOB NACHER, of La Crosse, in the county of La Crosse, and State of Wisconsin, have invented a new and improved Machine for Cutting Meat; and I do hereby declare that the following is a full, clear, and exact description thereof, which will enable those skilled in the art to make and use the same, reference being had to the accompanying drawings forming part of this specification.

This invention relates to a new and improved method of cutting and chopping meat for sausages, &c., whereby the same is more rapidly and economically done.

It consists in two or more knives bolted to a reciprocating cross-head, said knives moving up and down between cleaners, whereby the meat is prevented from adhering to the knives.

It consists, also, in two pawls, pivoted to a connecting-rod attached to said cross-head, which so engage in the teeth of toothed wheels attached to a horizontal shaft, on which said shaft is a geared pinion, which, fitting into a rack on the under side of the meat-box, gives to said meat-box an intermittent backward and forward motion under said knives.

It consists, also, of a vibrating-guard, operated by a lever pivoted to the frame of the machine, one or the shorter end of said lever being hit by a start on the end of said meat-block. Said guard is thrown either over one or the other of said wheels, so as to prevent one or the other of said pawls from engaging in the teeth of said toothed wheels, whereby the direction of the motion of said meat-block is changed. In the accompanying plate of drawings—

Figure 1 is a left side view of my invention.

Figure 2 is a front view of the same.

Figure 3 is a central vertical sectional view of the same, taken in the line $x\ x$, fig. 2.

Similar letters of reference indicate corresponding parts.

A is the frame of the machine; B is an upright on the same, to support the parts; C is the main shaft; D is a brace, supporting one end of the same; D' is a brace, supporting the other end of the same; E is a fly-wheel on the same; E' is a handle in the wheel E; F is a spur-gear wheel on the shaft C; G is a horizontal shaft on the under side of frame A; G' is a spur-gear pinion on the same; $a$ are cranks on the same; H is a cross-head; $a^1$ are connecting-rods, connecting the cross-head H to the cranks $a$; I are knives, bolted to cross-head H; J are cleaners; K is the meat-block; $e$ is a rack on the same; $e^1$ are starts on the same; L is a shaft on the side of frame A; $e^2$ is a spur-gear pinion on the same; $a^2$ are toothed wheels on the same; $m$ is a rod, bolted to one side of the cross-head H to support the pawls $n$, and through which said pawls are operated; $n$ are pawls; $o$ is a vibrating-guard; P is the track, on which the meat-box K slides; $o'$ is a support for the shaft L; $s$ is the lever, by means of which the guard $o$ is operated; $s'$ is a pivot, on which lever $s$ turns.

The frame A is made of joist, and consists of two side pieces, joined together at convenient points, so as to form a horizontal frame, supported at the proper height by suitable legs, as shown in the drawing, and may be of any suitable width and length to receive the knives I, and admit of the forward and backward movement of the meat-block K upon the same, suitable rails being laid upon the top of the frame A for that purpose. The meat-block K is made of wood, and is provided with a rim entirely around the edge of the same, to prevent the meat from falling from said block while being cut or chopped. The meat-block K may be of any desired length, according to the quantity of meat to be cut, and must be a little narrower than the top of the frame A. To the frame A, on each side of the same, near the centre, are rigidly secured by bolts or screws the uprights B. Said uprights B are made of iron, or other suitable material, of sufficient height to allow of the upward and downward movement of the cross-head, and are jointed together at the top by a metallic cross-bar, bolted to the top of said uprights, as shown in the drawing. The uprights B are provided with a vertical slot through each of the same, to receive projections on the end of the cross-head H, and guide said cross-head in the movement of the same, said slots being of sufficient length to permit the full movement of the cross-head H.

Upon the inside of the right-hand upright, and near the centre of the same, or at any convenient point in the same, is bolted by one end a metallic brace, D'. Said brace D, extending downwards to the frame A, is bolted firmly thereto, the object of the said brace D' being to furnish a support for the inner end of the shaft C, said brace being provided with suitable bearings or boxes therefor. To the outside of the same upright, B, is firmly bolted, at any convenient point on the same, another metallic brace, D, by one foot of the same. Said brace D is formed or bent in such a manner as to project outwards horizontally from the frame A, to allow sufficient length to the shaft C, between the brace D' and the brace D, to receive the geared wheel C upon the same, as shown, said brace D being secured to the frame A by the other foot of the same, by bolts or screws. The object of the said brace D is to support the outer end of the shaft C, and is provided with suitable bearings in the same for that purpose, opposite to and in the same straight line with the bearings in the brace D', as shown.

The shaft C is made of iron, of sufficient size for strength, and rotates in bearings in the braces D' and D, as above described, extending from the said braces D' to and through the brace D, and beyond the same, so as to receive the fly-wheel E. The fly-wheel E is an iron wheel, and is keyed to the shaft C in the ordinary way, and is provided with a handle, E, by means of which the machine is operated by the hand.

Upon the shaft C, and rigidly keyed thereto in the ordinary way, is an iron spur-geared wheel F. Upon the under side of the top of the frame A, and rotating in suitable boxes thereon, is a metallic horizontal shaft, G. Said shaft G extends across the frame A, and beyond the same, so as to receive upon each end of the same a crank, $a$. The cranks $a$ are provided with crank-pins in the ordinary way, and so as to receive the lower end of the connecting-rods $a^1$, properly constructed and arranged to receive said crank-pins, the length of the crank $a$ being one half of the length of the motion required for the knives I. The connecting-rods $a^1$ are of the ordinary form, and are pivoted to the cross-head H also in the ordinary way, the object of the said cranks $a$ and connecting-rods $a^1$ being to change the rotating motion of the shaft G into a reciprocating rectilinear motion of the cross-head H.

To the shaft G, and at one end thereof, and so as that the teeth of the same will engage with the teeth of the wheel F, is keyed in the ordinary way the spur-geared pinion G'. The wheel F and the pinion G' are to each other, with respect to their size and number of teeth, in the ratio of about two to one, or in any other ratio, so as to give the required speed to the shaft G.

The cross-head H is made of iron, or other suitable material, and extends across from one of the uprights to the other, and is provided on each end with a projection, which, fitting in the slot in each of said uprights B, serves to guide the same in the upward and downward movement thereof. To the cross-head H, and so as to project downwards under the same, and rigidly secured thereto by nuts upon the same, are two arms, secured also at the lower ends of the said arms to the knives I by rivets or otherwise.

Said arms pass through the cross-head H through a hole bored to receive the same, and are provided with a screw-thread, so as to receive a nut, both above and below said cross-head H, so as the knives I, attached to said arms, may be adjusted to any convenient height from the block K, or so as just to touch the same at the full extent of the downward movement thereof. The knives I are made of steel, or steel and iron combined, are rectangular in form, of any convenient size, and are firmly riveted to the said arms on the cross-head H, so as to stand across the block K, as shown, and may be of any convenient number, as two; the lower edge of said knives being made sharp, so as to cut the meat placed on the block K.

Upon one side of the frame A, or upon the left-hand side of the same, as shown, and rotating in suitable boxes on the same, and so as to be directly above the shaft G, is a short metallic shaft, L. Upon one, or upon the left-hand end of the shaft L, and properly keyed thereto, near one of the bearings of the same, are two notched or toothed metallic wheels, $a^2$, the notches in one of said wheels hooking or curving in one direction, and the notches in the other of said wheels $a^2$ curving in the opposite direction. Upon said shaft L, and keyed firmly thereto, near the other bearing of the same, is a spur-geared pinion, $e^1$, so situated and arranged as that the teeth of the same will engage in the teeth of the rack $e$.

Upon the under side, and near the left-hand edge of the block, and extending the whole length of said block, is a metallic rack, $e$, into the teeth of which said rack $e$, the teeth of the pinion $e^1$ mesh, as above described, and so as that by rotating the shaft L in either direction, the block K will be driven in the same direction upon the track P, the rotating motion of the shaft L being changed into a rectilinear motion of the block K.

Through the cross-head H, at one end thereof, so as that the lower end of the same will be in a vertical line over the wheels $a^2$, and so as to extend downwards, is a metallic rod, $m$. Said rod $m$ is provided with a screw-thread upon the upper part of the same, so as to receive a nut thereon, both above and below the cross-head H, by means of which the length of said rod $m$ below the cross-head H may be adjusted.

To the lower end of the rod $m$ are pivoted two pawls $n$. Said pawls $n$ are made of iron, and extend down from the end of the rod $m$, one on one side of the wheels $a^2$, and the other on the other side of the same, as shown in the drawing, fig. 1. Said pawls, $n$, are provided on the side of the same towards each other with hooks, bending upwards, so as that said hooks will engage with the notches in said wheels $a^2$, when the cross-head H is moving upwards, one of said hooks on one of the pawls $n$ being prevented from engaging in the notches of the said wheels by the guard $o$, hereinafter more fully described, while the other is left free to engage with the notches in one of the wheels $a^2$. The upward movement of one of the pawls $n$, engaging in the notches in one of the wheels $a^2$, turns the shaft L in one direction, while the upward movement of the other of said pawls, engaging in the notches of the other of said wheels, turns the shaft L in the opposite direction; neither of said pawls $n$ having any effect in the downward movement of the same, the hooks in the same in that case sliding over the notches in said wheels $a^2$, said notches being shaped for that purpose in the usual way. The hooks in the pawls $n$ engage with the notches in the wheels $a^2$ during only a small portion of the upward movement of said pawls $n$, so that block K, which is moved under the knives I by the shaft L, connected as above described, moves only a short distance, when said block stops until another upward movement of the cross-head H; the object of said arrangement being to feed the meat upon the block K under the knives I a little further at each upward movement of the same, and so as that in the downward or cutting movement of the knives, the block K will not be in motion.

Upon the shaft L is pivoted a metallic guard, o, in such a way that by turning said guard in one way, the notches in the wheels $a^2$ will be covered, so that the hook of the pawl n on that side will not engage with said notches, while the hook on the other pawl, n, will be brought by the force of gravity to engage with the notches in the other of said wheels $a^2$, and thus give motion to the shaft L and block K in one direction, and by reversing the guard o, the first pawl n will engage in the notches of the other wheel, the other pawl, n, being prevented from engaging by the guard o, and a reverse motion will be given to the block K.

Upon the frame A, and near the centre thereof, is pivoted a lever, s, by a pivot, s', so that the longer arm of the said lever will engage in a slot in the guard o, by means of which said guard o is changed from one side to the other of the wheels $a^2$, as above described, the shorter arm of said lever being bent up so that when the block K has moved nearly to the full length of the motion thereof in one direction, the start $e^1$ on one end of the block K, will strike the shorter arm of said lever s, and change the guard o, and change the direction of the motion of the block K, a start, $e^1$, being rigidly secured to said block K, so as through said lever s and guard o, to change the direction of each motion of the block K, so as to produce an intermittent reciprocating rectilinear motion of the block K, for the purpose of feeding the meat on the same, under the knives I, until the meat upon the same is completely cut or chopped. Bolted upon the uprights B, one on each side of each knife I, and parallel therewith, are metallic plates, J, approaching near to each other, so as that, themselves being stationary, said plates J will scrape the meat from the knives I in the upward movement of said knives I between said plates J.

The operation is such that, by rotating the wheel E, by hand or otherwise, an upward and downward movement is given to the knives I, attached to the cross-head H, through the connections above described, the meat on the block K being fed alternately forward and backward under the same, as above described, the meat on the block K being prevented from adhering to the knives I by the stationary plates J.

Constructed as above shown and described, it constitutes an automatic machine for the chopping of meat whereby the same is more effectually and economically done.

I claim as new, and desire to secure by Letters Patent—

1. An automatic machine for cutting or chopping, composed of a block, K, moving backwards and forwards under the reciprocating knives I, in combination with the guard o and pawls n and wheels $a^2$, by means of which the motion of the same is reversed, substantially as shown and described, and for the purposes set forth.

2. The pawls n, in combination with the cross-head H and wheels $a^2$ and shaft L and pinion $e^2$ and rack s and block K, substantially as shown and described, and for the purposes set forth.

3. The lever s, in combination with the guard o and starts $e^1$, substantially as shown and described, and for the purposes set forth.

4. The plates J, in combination with the uprights B and knives I, substantially as shown and described, and for the purposes set forth.

5. The pawls n, in combination with the reversible guard o and wheels $a^2$, substantially as shown and described, and for the purposes set forth.

JACOB NACHER.

Witnesses:
  H. E. HUBBARD,
  HOWARD CRAMER.